June 13, 1972   D. J. PAGE ET AL   3,669,661

METHOD OF PRODUCING THIN FILM TRANSISTORS

Filed March 6, 1970   3 Sheets-Sheet 1

INVENTORS
DERRICK J. PAGE &
MICHAEL C. DRIVER
BY C. Y. Menzemer
ATTORNEY

United States Patent Office 3,669,661
Patented June 13, 1972

3,669,661
METHOD OF PRODUCING THIN FILM TRANSISTORS
Derrick J. Page, Pittsburgh, and Michael C. Driver, Trafford, Pa., assignors to Westinghouse Electric Corporation, Pittsburgh, Pa.
Filed Mar. 6, 1970, Ser. No. 17,197
Int. Cl. G03c 5/00
U.S. Cl. 96—36.2                                    8 Claims

ABSTRACT OF THE DISCLOSURE

This disclosure is concerned with a method of producing a thin film transistor on a substrate by evaporating layers of various materials from sources positioned at various angles to the substrate normal.

RELATED APPLICATIONS

This invention sets forth a method of producing the thin film, field effect transistor of U.S. patent application Ser. No. 747,064, filed June 24, 1968 now abandoned.

BACKGROUND OF THE INVENTION

Field of the invention

This invention is in the field of preparation of thin film semiconductor devices.

Description of the prior art

Thin film transistor (TFT) and especially thin film field effect transistors (TFFET) are produced by the vacuum evaporation of layers of metals, semiconductors, and insulators onto a substrate. The evaporations are made through a system of masks that define the shapes of the various materials evaporated.

To produce field effect transistors that operate at high frequencies it is necessary to produce a transistor having a narrow gap between the source and drain. In addition, the gate must be deposited between the source and drain.

To date, processing limitations have limited the frequencies at which a TFFET will operate. For example, the narrowest source to drain spacing that it is possible to achieve by using a metal mask is 10 microns due to limitations set by photolithographic and etching processes used to produce the metal mask.

Even if it were possible to produce a transistor with a smaller source and drain spacing using a metal mask, the mask could not be repeated because the narrower the bridge forming the source drain spacing, the more easily the mask becomes clogged. A mask with a gate defining slit of 1 micron can only be used once before becoming clogged sufficiently to lose tolerance.

An object of this invention is to provide a process for making a high frequency transistor in which the spacing between the source and drain is at an absolute minimum.

Other objects will be obvious and will appear hereinafter.

SUMMARY OF THE INVENTION

In accordance with the present invention and attainment of the foregoing objects there is provided a process for producing a thin film transistor comprising, disposing a layer of a spacer material on one surface of a substrate, disposing a layer of a metal on said layer of spacing material, coating at least a portion of said metal layer with a layer of a photoresist material, exposing a pattern on said layer of photoresist material, developing said pattern on said layer of photoresist material, etching said pattern through to said one surface of the substrate, disposing said substrate in a vacuum chamber and sequentially vacuum depositing a plurality of materials through said etched pattern onto said surface of the substrate.

DESCRIPTION OF THE DRAWINGS

For a better understanding of the nature and objects of the invention, reference should be had to the following detailed description and drawings in which.

DESCRIPTION OF THE DRAWING

Figure 1:
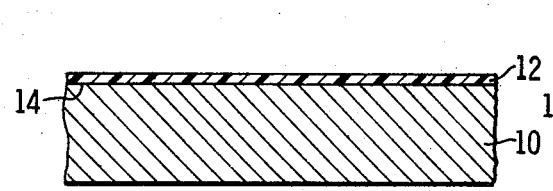
FIGS. 1 to 3 are side views of a substrate being processed in accordance with the teachings of the invention.

With reference to FIG. 1, there is shown a section of substrate 10 suitable for use in practicing the teachings of this invention.

The substrate 10 may be rigid or flexible, metallic or non-metallic and should have a thickness of at least 2 to 5 mils. Examples of rigid substrate material are polished glass, sapphire, quartz bodies, diamond and silicon carbide. These materials are all non-metallic. Metallic, rigid substrates would include blocks of metals such as a aluminum and copper.

Examples of flexible substrate, and by flexible it is meant a material that can be wrapped around a mandrel of, at the maximum, one inch in diameter and preferably a mandrel of the order of one-eighth in diameter, include both metallic and non-metallic materials as for example, paper, polyethylene terephthalate, esters and ethers of cellulose such as ethyl cellulose; cellulose acetate; and cellulose nitrate; regenerated cellulose such as cellophane; polyvinyl chloride; polyvinyl chloride-acetate; polyvinylidene chloride; nylon film; polyimide and polyamide-imide films; polytetrafluoroethylene; polytrifluoromonochloroethylene; and tapes and foils of the metals: nickel, aluminum, copper, tin, tantalum smooth beryllia base alloys of these metals and ferrous base alloys such as for example thin gauge stainless steel strip.

Metal foil or tape substrates are preferred because of the metals relatively better thermal conductivity than non metals.

If the substrate 10 is an electrically conductive metal for example aluminum a layer 12 of electrically insulating material is disposed on top surface 14 of the substrate 10 before carrying out the process of this invention or the layer 12 may be applied during the process.

The layer 12 may be of any electrical insulating material that will adhere to the substrate surface. Suitable examples include anodic oxide of the tape metal itself, as for example, aluminum oxide if the metal substrate is aluminum; cured electrically insulating resinous materials which are used as insulators on electrically conductive wire for example, polyvinyl formed phenolic resins sold under the trademark Formex, epoxy resins including mixtures with polyamides-imides and polyimide resins.

The thickness of layer 12 need only be what is necessary to insulate the transistor which is to be prepared on the substrate.

Figure 2:
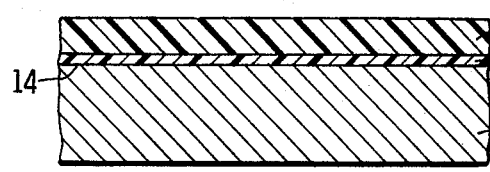

With reference to FIG. 2, a layer 16 of spacer material is then disposed over layer 12 of insulating material.

The spacer material 16 may be comprised of any material which can be easily dissolved away or readily etched. The importance of this feature will become obvious as the process is described in more detail. Examples of suitable materials which may be used as spacer materials include polymethyl-methacrylate which is readily soluble in acetone, sodium chloride which is readily soluble in water, copper which is easily etched with nitric acid and aluminum which is easily etched with a solution of nitric acid or sodium hydroxide. In addition, any organic compound such as polystyrene which will dissolve readily in an organic solvent such as toluene, benzene, alcohols and the like may be used.

The thickness of the spacer layer is dependent on the characteristics desired in the final device and the processing equipment employed. This feature will be discussed in more detail later. However, a thickness of 5 to 20 microns is usually satisfactory.

Figure 3:
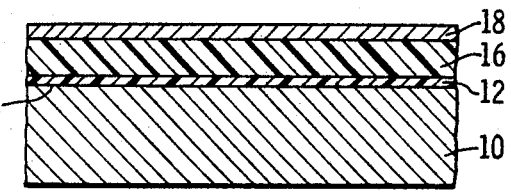

With reference to FIG. 3 a layer 18 of a metal is then disposed over the layer 16 of spacer material or at least over a portion of the spacer material. The thickness of this layer 18 is not critical. A thickness of 500 A. to 1000 A. has been found satisfactory.

The layer 18 of metal may be comprised of any metal that does not dissolve in the solvent of the spacer layer or is not readily etched by the etchant for the spacer layer. Suitable examples of metals which may be used are gold, platinum, titanium and chromium.

Figure 4:
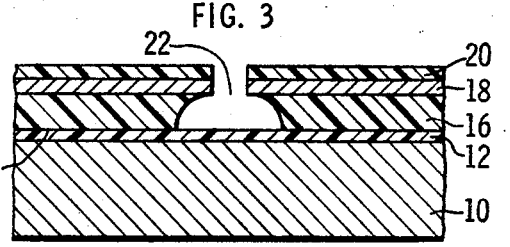
FIG. 4 is a side view of a substrate preparatory to the deposition of a semiconductor thin film device thereon.

With reference to FIG. 4 a layer 20 of a photoresist material is then disposed over at least a portion, and preferably all of layer 18. A slot and pad pattern is then printed onto the resist layer 20, and the pattern developed in the resist. The developed resist portion of the pattern is then removed by any suitable means known to those skilled in the art.

Figure 5:
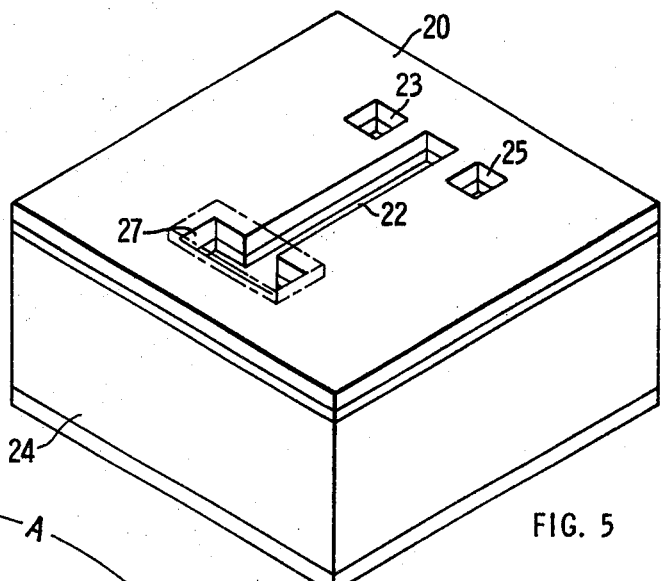
FIG. 5 is a three dimensional perspective view of the substrate of FIG. 4.

An opening in the form of a slot 22 and pads 23, 25 and 27 are then made in the metal layer 18 by etching or by any other method known to those skilled in the art and by using a solvent or etchant a portion of the spacer layer 16 is removed whereby a portion 24 of the insulating layer 12 is exposed. FIG. 5 shows a three dimensional view of the structure at this point.

Slot 27 is masked over again with a mechanical mask.

The substrate structure is then disposed in a vacuum chamber and the chamber pumped down to a pressure of less than $10^{-5}$ torr and preferably less than $10^{-7}$ torr.

The substrate is then positioned for the vapor deposition of source and drain electrodes. The source and drain may consist of any metal selected from the group consisting of gold, silver, aluminum and nickel.

Figure 6:
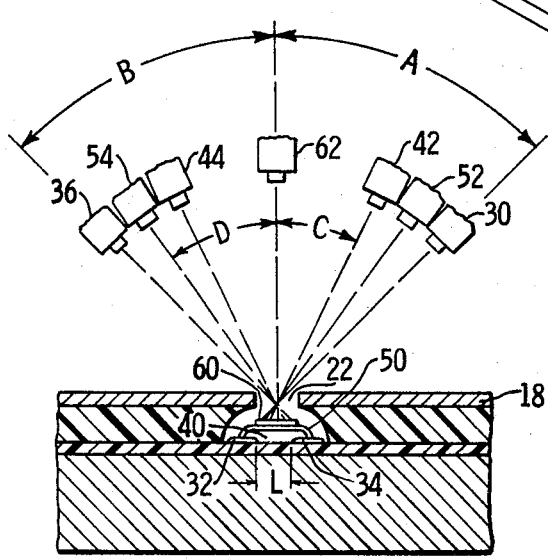
FIG. 6 is a side view of the substrate of FIG. 4 during the process of this invention.

With reference to FIG. 6, source 30 from which the metal which will form source electrode 32 is delivered to the substrate is at an angle A from the vertical. The metal vapor passes from source 30 through opening 22 in metal layer 18 and strikes a portion of exposed portion 24. The angle A is an angle whose tangent is:

$$\text{Tangent}^{-1}\left(\frac{\text{distance between source and drain electrodes}}{\text{thickness of spacer layer}}\right)$$

and the width of the source electrode 32 is dependent on the size of opening 22.

Figure 7:
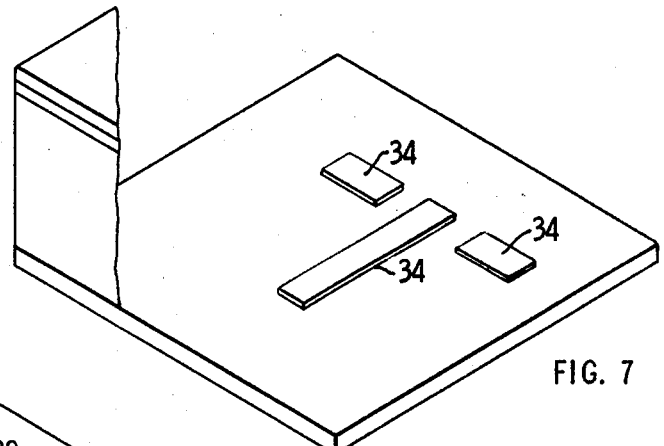
FIGS. 7 to 11 are cut away perspective views of the substrate of FIG. 4 during the processing in accordance with the teachings of this invention.

After deposition of source electrode 32, drain electrode 34 is deposited from a source 36 which is an angle B from the vertical. Angles A and B are equal and calculated in the same manner. To produce a thin film field effect transistor for microwave use it is desired to have the distance "L" between the source and drain electrodes 32 and 34 respectively to be about 1 micron. With reference to FIG. 7, there is shown the relative position of the source 32 and drain 34 electrodes on the insulator surface portion 24.

With reference to FIG. 7, there is shown the relative position of the source electrode 32 on the portion 24 of insulator layer 12.

Figure 8:
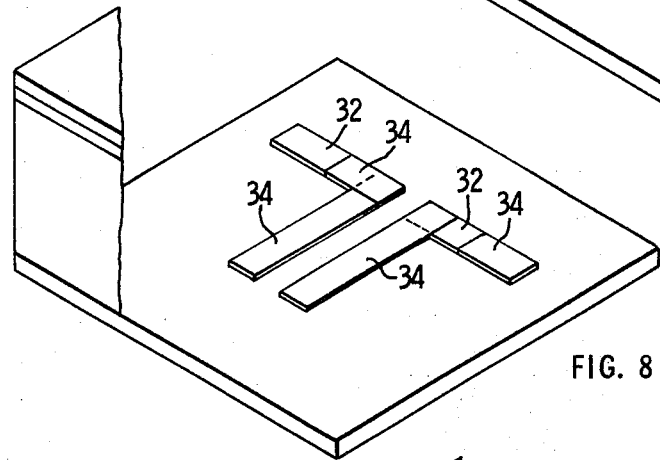

With reference to FIG. 8 there is shown the relative position of the source electrode 32 on the portion 24 of insulator layer 12 relative to the drain electrode 34 of FIG. 7.

Satisfactory devices have a source electrode 32 and drain electrode 34 having a thickness of from about 100 A. to 500 A. The metal forming the electrodes having been deposited at a rate of about 0.1 A. to 50 A. and preferably from about 0.7 A. to 6 A. per second. Very good devices have been formed in which the source and drain electrodes were formed by depositing gold to a thickness of from 100 A. to 300 A. at a rate of from 0.7 to 6 A. per second.

Following the formation of the source 32 and drain 34 electrodes the pad areas 23 and 25 are blanked off with mechanical masks or by any other suitable means known to those skilled in the art.

With reference again to FIG. 6, next a layer 40 of semiconductor material is deposited between source electrode 32 and drain electrode 34.

The layer 40 may consist of any semiconductor material as for example tellurium, cadmium sulfide, silicon, cadmium selenide, indium arsenide, gallium arsenide, tin oxide and lead telluride.

The layer 40 of semiconductor material is in contact with an extends between the source electrode 32 and the drain electrode 34. Preferably, the layer 40 partially overlaps the source and drain electrodes.

The layer 40 of semiconductor material may be deposited from a single source 42 which is rotated in an arc or a plurality of sources, such as source 42 and 44 of FIG. 6 may be used.

Sources 42 and/or 44 and any others if employed are disposed at an angle C from the vertical. The angle C is determined by the equation:

$$0 < \angle C \leq \tan^{-1}\left(\frac{\frac{1}{2}\text{ distance between source and drain electrodes}}{\text{thickness of spacer layer}}\right)$$

The semiconductor material passes through the opening 22 and is deposited on and between the source electrode 32 and drain electrode 34.

Figure 9:
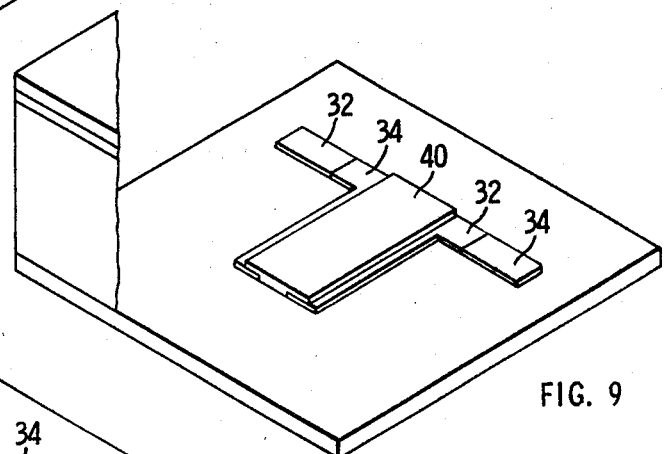

With reference to FIG. 9, there is shown the layer 40 of semiconductor material relative to the source electrode 32 and drain electrode 34.

The thickness of the semiconductor layer 40 may vary from an average thickness of 40 A. for tellurium to several thousand angstroms for wider band gap materials such as cadmium sulfide and cadmium selenide.

With reference again to FIG. 6, next a layer 50 of an electrically insulating material is disposed over at least a portion of the layer 40 of semiconductor material.

The insulation layer 50 may be comprised of a suitable electrical insulating material selected from the group consisting of inorganic insulators such as silicon monoxide, silicon dioxide, aluminum oxide, calcium fluoride, magnesium fluoride and polymerizable organics such as polymers of hexachlorobutadiene, divinyl benzene, aryl sulfones, fluorinated alkenyls (e.g. polytetrafluoroethylene) and para-xylene.

The insulation layer 50 should be as thin as possible so that modulation can be produced in the device current at a relatively low voltage. However, the layer must serve as an adequate electrical insulator. A layer of 100 A. has occasionally been found to contain pin holes which adversely effect the electrical insulation function of the layer. A thickness of about 300 A. appears to be the minimum thickness which will ensure that there are no pin holes while 1000 A appears to be optimum between a void free insulation layer and low voltage modulation. As the operating voltage of the device increases to 100 volts, a thickness of about 3000 A. is desirable and at an operating voltage of 200 volts a thickness of about 500 A. to 600 A. is desirable.

The layer 50 of electrically insulating material may be deposited from a single source 52 which is rotated in an arc or a plurality of sources, such as sources 52 and 54 of FIG. 6 may be used.

Sources 52 and 54 and any others if employed are disposed at an angle D from the vertical. The angle D is equal to or greater than angle C but is always less than the maximum value of C defined previously.

The electrical insulating material passes through the opening 22 and is deposited on layer 40 of semiconductor material.

Figure 10:
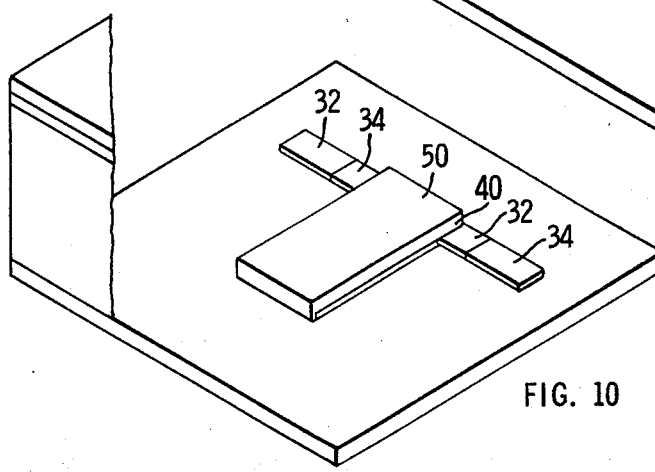

With reference to FIG. 10 there is shown the layer 50 relative to the previously disposed layers of material.

With reference to FIGS. 5 and 6 again, the mask which was disposed over pad 27 is removed, and a gate electrode 60 is vapor deposited onto the structure.

The gate electrode 60 is disposed on the insulation layer 50 between the source electrode 32 and the drain electrode 34.

The gate electrode 60 consists of a good electrically conductive metal such as a metal selected from the group consisting of aluminum, copper, tin, silver, gold and platinum. In order to ensure that the gate electrode 60 provides a high conductivity, it should have a thickness of from 300 A. to 1000 A. and preferably from 500 to 1000 A.

The gate electrode 60 is deposited from a source 62 which is disposed on the vertical.

The metal comprising the gate is deposited through the opening 22 and pad opening 27.

Figure 11:
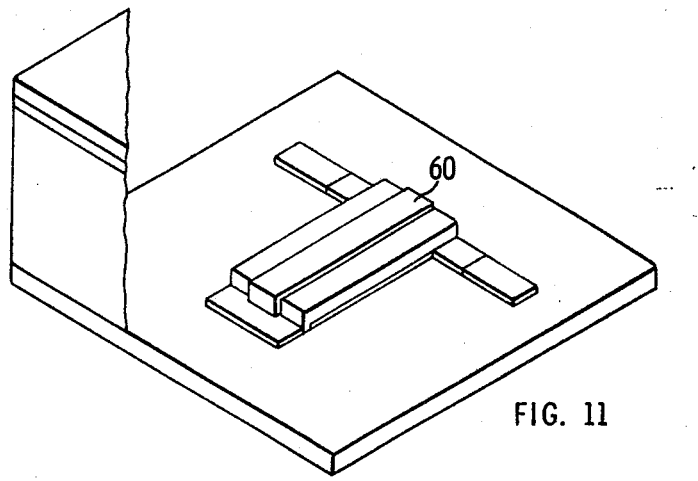

With reference to FIG. 11 there is shown the gate 60 relative to the previously disposed layers of material.

With the deposition of the gate electrode the device is complete and the substrate is removed from the vacuum chamber.

It will be appreciated of course that several devices may be prepared on the same substrate and that the substrate can be moved through the vacuum chamber much like a roll of film is pulled along a spool.

Figure 12:
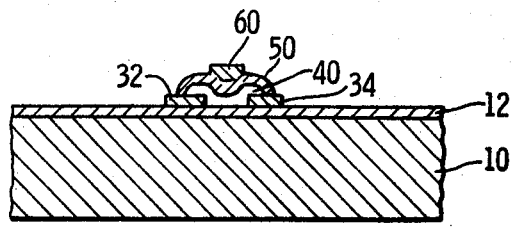
FIG. 12 is a side view of a thin film FET prepared in accordance with the teachings of this invention.

With reference to FIG. 12 there is shown the field effect transistor prepared in accordance with the teachings of this invention.

The advantages of following the teachings of this invention are numerous.

First a device can be prepared without the use of costly metal masks.

Secondly, the device can be prepared with a chosen spacing between the source and drain electrode than is possible with the conventional masking system.

Figure 13:
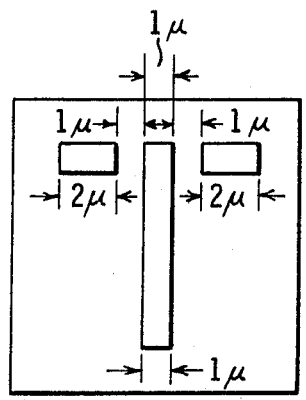
FIG. 13 is a top view of the substrate of FIG. 5 setting forth some dimensional relationship.

With reference to FIGS. 5 and 13, there is shown the spacing between pads 23 and 25 and slot 22 which will allow the fabrication of a device such as discussed hereinabove with a one micron spacing between the source and drain electrodes.

Thirdly, the control over spacing is extremely good. If the thickness of the spacer layer 16 is 10 microns and the vertical distance from the metal layer 18 to material source is 10 cm. then horizontal distance becomes $$\frac{D}{d} = \frac{10 \text{ cm.}}{10\mu} = 10^4$$

Figure 14:
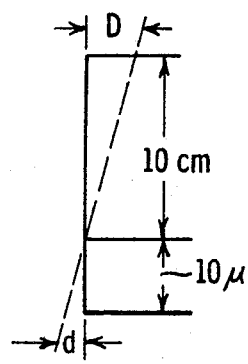
FIG. 14 is a graphical representation of some of the distance and dimensional relationship of this invention.

This relationship is shown graphically in FIG. 14.

From this it can readily be seen that close control can be maintained over the spacing of the various layers on the substrate.

Devices prepared in accordance with the teachings of this invention will have frequency ranges to above 4 gHz. with carrier mobility of only 50 cm.$^2$/v. sec. With a carrier mobility of 200 cm.$^2$/v. sec. the frequency response of the device is up to 16 gHz.

We claim as our invention:

1. A process for producing a thin film transistor comprising:
    (1) disposing a layer of a spacing material on one surface of a substrate,
    (2) disposing a layer of a metal on said layer of spacing material,
    (3) coating at least a portion of said metal layer with a layer of a photoresist material,
    (4) exposing a pattern on said layer of photoresist material,
    (5) developing said pattern on said layer of photoresist,
    (6) etching said pattern through to said one surface of the substrate,
    (7) disposing said substrate in a vacuum chamber, and
    (8) sequentially, vacuum depositing a plurality of materials through said etched pattern onto said one surface of the substrate,
whereby a thin film semiconductor device is formed on said one surface.

2. The process of claim 1 in which said substrate is an electrically conductive metal and said one surface of the substrate has a layer of an electrically insulating material disposed thereon.

3. The process of claim 1 in which at least some of the materials deposited on the substrate are directed at the substrate from a source disposed at an angle off the vertical relative to the etched pattern and substrate surface.

4. The process of claim 1 in which the materials sequentially deposited are:
    (1) a metal,
    (2) a metal,
    (3) a semiconductor material,
    (4) an electrically insulating material, and
    (5) a metal.

5. The process of claim 4 in which the first two metals deposited originate from a source disposed at an angle off the vertical relative to the substrate surface whose tangent is a function of the desired distance between the first two metal depositions and the thickness of the layer of spacer material disposed on the substrate.

6. The process of claim 1 in which a portion of the pattern etched through to said substrate is masked over during a portion of the deposition of materials.

7. The processes of claim 4 in which the semiconductor material deposited originate from a source disposed at an angle off the vertical relative to the substrate surface whose tangent is a function of the distance between the two prior metal depositions and the thickness of the layers of spacer material disposed on the substrate.

8. The process of claim 1 in which the materials sequentially deposited originate from different sources, at least some of the sources being disposed at an angle off the vertical relative to the substrate surface, and the sources are spaced from the substrate surface a distance which is at least a magnitude greater than the thickness of the spacer layer.

References Cited

UNITED STATES PATENTS 3,256,588   6/1966   Sikina et al. ........... 96—36.2
3,089,793   5/1963   Jordan et al. .......... 96—36.2

OTHER REFERENCES

Baines: The Science of Photography, p. 216, Fountain Press (1958).

NORMAN G. TORCHIN, Primary Examiner

J. L. GOODROW, Assistant Examiner